(12) United States Patent
Fischer

(10) Patent No.: US 12,246,555 B2
(45) Date of Patent: Mar. 11, 2025

(54) METHOD AND SYSTEM FOR PROVIDING DECOR AND APPEARANCE BASED ON COLOUR CHANGE UNDER ILLUMINANT CHANGE

(71) Applicant: Fritz EGGER GmbH & Co. OG, St. Johann in Tirol (AT)

(72) Inventor: Klaus Fischer, Bad Berleburg (DE)

(73) Assignee: Fritz Egger GmbH & Co. OG, St. Johann in Tirol (AT)

( * ) Notice: Subject to any disclaimer, the term of this patent is extended or adjusted under 35 U.S.C. 154(b) by 70 days.

(21) Appl. No.: 17/430,121

(22) PCT Filed: Feb. 10, 2020

(86) PCT No.: PCT/EP2020/053308
§ 371 (c)(1),
(2) Date: Aug. 11, 2021

(87) PCT Pub. No.: WO2020/165083
PCT Pub. Date: Aug. 20, 2020

(65) Prior Publication Data
US 2022/0134798 A1 May 5, 2022

(30) Foreign Application Priority Data
Feb. 12, 2019 (DE) .................... 10 2019 103 427.2

(51) Int. Cl.
*H04N 1/60* (2006.01)
*B44C 5/04* (2006.01)
*B44D 3/00* (2006.01)
(52) U.S. Cl.
CPC ............ *B44D 3/003* (2013.01); *B44C 5/04* (2013.01); *H04N 1/6033* (2013.01); *H04N 1/6086* (2013.01)

(58) Field of Classification Search
None
See application file for complete search history.

(56) References Cited

U.S. PATENT DOCUMENTS 9,193,153 B2   11/2015  Kuhnberger et al.
11,021,006 B2   6/2021  Streichardt
(Continued)

FOREIGN PATENT DOCUMENTS

DE    102015118055 A1   4/2017
EP        2247451 A0   11/2010
(Continued)

*Primary Examiner* — Barbara D Reinier
(74) *Attorney, Agent, or Firm* — The Webb Law Firm

(57) ABSTRACT

The invention relates to a method for providing a decorative combination for furniture items and/or interior fixtures. The problem addressed of providing a method for producing a decorative combination, for which the matching of said combination with respect to a change of illuminant is further simplified, is solved by a method including the steps: carrying out colorimetric measurements, under at least two different illuminants, on a first decorative element of a first fixture; determining a reference colour change of the first decorative element when the change between the at least two different illuminants is made; printing a second decorative element onto a second fixture, a selection and/or combination of inks for the printing process being carried out on the basis of a colour change of the inks under a change of illuminant, such that a colour change of the second decorative element under the change of the at least two different illuminants is compared to the reference colour change. The invention also relates to a system, in particular for carrying out a method according to the invention, the system including a colorimeter, a printer and a control device.

16 Claims, 2 Drawing Sheets

(56) References Cited

U.S. PATENT DOCUMENTS

| | | | | |
|---|---|---|---|---|
| 2003/0007023 A1* | 1/2003 | Barclay | ............... | B41J 25/308 |
| | | | | 347/19 |
| 2006/0285134 A1* | 12/2006 | Viturro | ............... | H04N 1/6033 |
| | | | | 358/1.9 |
| 2008/0239348 A1* | 10/2008 | Kawai | ............... | H04N 1/6083 |
| | | | | 358/1.9 |
| 2010/0228511 A1* | 9/2010 | Chin | ............... | G01J 3/462 |
| | | | | 702/82 |
| 2014/0349087 A1* | 11/2014 | Jung | ............... | B05D 1/02 |
| | | | | 106/31.77 |
| 2016/0207307 A1 | 7/2016 | De Mondt et al. | | |
| 2020/0207118 A1 | 7/2020 | Lenaerts et al. | | |
| 2024/0007581 A1* | 1/2024 | Dicke | ............... | H04N 1/6008 |

FOREIGN PATENT DOCUMENTS

| | | | | |
|---|---|---|---|---|
| EP | 2865531 A1 * | 4/2015 | ............... | B41J 2/21 |
| EP | 3447098 A1 | 2/2019 | | |
| WO | 2009080160 A2 | 7/2009 | | |
| WO | WO-2018231982 A1 * | 12/2018 | ............... | G01J 3/0291 |

\* cited by examiner

METHOD AND SYSTEM FOR PROVIDING DECOR AND APPEARANCE BASED ON COLOUR CHANGE UNDER ILLUMINANT CHANGE

CROSS-REFERENCE TO RELATED APPLICATIONS

This application is the United States national phase of International Application No. PCT/EP2020/053308 filed Feb. 10, 2020, and claims priority to German Patent Application No. 10 2019 103 427.2 filed Feb. 12, 2019, the disclosures of which are hereby incorporated by reference in their entirety.

BACKGROUND OF THE INVENTION

Field of the Invention

The invention relates to a method for providing a decor combination for furniture parts and/or interior fittings. The invention also relates to a system, in particular for carrying out a method according to the invention, the system comprising a colour measuring device, a printer and a control device.

Description of Related Art

Panel-shaped materials with decors are used in furniture construction, interior finishing and other applications such as the interior finishing of vehicles. Panel-shaped materials are in particular wood-based panels, for example chipboard, fiberboard or OSB panels (oriented strand board), compact panels (high-pressure laminated panels according to European standard EN 438 Parts 1 to 7) or plastic panels, for example panels made of thermoplastic or thermosetting plastics. Panel-shaped materials are provided with a first decoration on a panel surface, in particular when used in furniture or interior design. The first decoration is produced, for example, by applying printed decorative paper to a layer structure on the panel surface of the panel-shaped material or by direct printing on the panel surface.

Such panel-shaped materials are often provided with plastic edge profiles on their narrow surfaces (side edges). The edge profiles are glued or welded to the narrow sides of the panel (so-called edging), e.g. using laser or hotair technology. The edge profiles serve on the one hand as a visually appealing finish to such panels, and on the other hand as protection of the narrow sides against impacts or against the penetration of moisture. Edge profiles of this type are also frequently provided with a second decor, which in the case of laminate or laminate edges is provided, for example, by a printed decorative paper integrated into the layered structure, or in the case of extruded profiles, for example, by direct printing on the plastic profile.

If panel-shaped materials are used in interior construction, for example to form floor elements, wall panelling or ceiling elements, there is often also a combination with other visible components, for example skirting boards, frame mouldings or ceiling mouldings.

Finally, panel-shaped materials with decors are also combined with each other, for example in furniture construction. In a piece of furniture, for example, the front parts and side parts can have decors. Likewise, arrangements of pieces of furniture such as kitchen units or cupboard walls can be equipped with decor combinations, wherein, for example, adjacent front parts have decors that match each other.

Decors are increasingly being produced using digital printing processes that are based on a limited number of basic colours. The problem with matching decors in printing processes is that the appearance of a decor can change with the illuminant. For example, a metamerism effect can occur between decors, wherein the decors have no colour difference in a first type of light, while a colour difference develops between the decors when the illuminant changes to a second illuminant that is different from the first. The decors thus have approximately the same appearance with one illuminant, but are subject to a different colour shift when the illuminant is changed. A metamerism index is specified in DIN 6172 to record this effect.

EP 2 247 451 A2 describes a method for producing a decorated profile body, wherein essentially no metamerism effect should occur between the decor of the profile body and a similar, preferably identical, reference decor. In this case, the decorative base should have a colour structure consisting of an extended colour space compared to the decorative finish.

A method for producing decorative surfaces is known from US 2016/207307 A1. The process comprises the following steps: Impregnating a paper substrate with thermosetting resin, ink jet printing a colour pattern with one or more aqueous ink jet inks containing a polymeric latex binder onto the thermosetting resin impregnated paper, and hot pressing the thermosetting paper carrying the colour pattern into a decorative surface. For the most faithful reproduction of wood colours with minimal metamerism, the metamerism index should preferably not be greater than one.

The present invention has set itself the object of specifying a method for providing a decor combination for furniture parts and/or interior fittings, wherein the matching of the decor combination is further simplified with regard to a change of the illuminant. In addition, a system comprising a colour measuring device, a printer and a control device is to be described for solving this task.

SUMMARY OF THE INVENTION

According to a first teaching, said object is solved with respect to a method, the method comprising: performing colour measurements under at least two different illuminants on a first decoration of a first component; determining a reference colour change of the first decoration under the change between the at least two different illuminants; and printing a second decoration on a second component, wherein a selection and/or an assembly of inks for printing is performed based on a colour change of the inks under a illuminant change such that a colour change of the second decoration under the change between the at least two different illuminants is matched to the reference colour change, wherein the at least two different types of ink of a basic colour are provided in separate containers and are combined before printing and/or during printing in such a way that the colour change is matched to the reference colour change.

According to a second teaching, said problem is solved with respect to a system, said system comprising: a colour measuring device for performing colour measurements under at least two different illuminants on a first decoration of a first component; a printer for printing a second decoration on a second component; and control means adapted to perform a determination of a reference colour change of the first decoration under the change between the at least two different illuminants, wherein the control means is further adapted to determine a selection and/or a composition of inks for printing based on a colour change of the inks under a change of illuminant such that a colour change of the second decoration under the change between the at least two different illuminants is matched to the reference colour change. The system according to the second teaching is particularly adapted to perform a method according to the first teaching.

By performing colour measurements under at least two different illuminants on a first decor of a first component, colour measurement values are obtained for the respective illuminant. The colour measurement values can be set as a function of the illuminant. For example, a dependence on the illuminant is determined for at least one colour measurement value (e.g. at least one colour channel), wherein in particular discrete colour measurement values are represented via a measurement curve. Optionally, modelling can be carried out for the discrete colour measurement values, for example in the form of a compensation curve.

This results in particular in a measure for a colour shift of the first decor under a change of the illuminant. The reference colour change can be indicative of a colour shift of one or more colourimetric values, for example at least one colour channel.

A printing of a second decoration on a second component is performed using inks. Direct printing may be provided on the second component to produce the second decoration and/or a second decoration may be printed on a decoration carrier such as a decoration paper, the decoration carrier being provided for the second component.

To print the second decoration, a selection and/or a combination of inks is performed. For example, one or more inks can be selected from a predetermined group of inks, or inks can be created or predetermined inks can be mixed together. The selection and/or composition of inks is carried out on the basis of a colour change of the inks under a change of illuminant. For example, the selection and/or composition of the inks is performed based on the colour change caused by a pigment type, pigment size and/or a binder for the inks. The illuminant change for the colour change of the inks may be the change between the at least two illuminants on which the colour measurements on the first decor are based, although this is not mandatory. For the selection and/or the composition of inks, the properties of the colour change under the illuminant change are already at least partially known and/or can be at least partially determined within the scope of the method according to the first teaching. For the selection and/or composition of the inks, a print data set can be created within the scope of the method according to the first teaching or, in particular, with the control unit of the second teaching, which specifies the selection/composition of the inks.

The selection and/or composition of the inks is performed in such a way that a colour change of the second decor under the change between the at least two different illuminants is matched to the reference colour change. Accordingly, an undesired colour shift in a decor combination of the first and second decor can be easily reduced or avoided. The matching of the reference colour change and the colour change of the second decor may be a minimisation of the difference of the reference colour change and the colour change of the second decor under the change of the at least two illuminants. In this case, the minimisation can be performed on the basis of a predetermined group of inks or pigment types, pigment sizes and/or binders.

The process can thus be carried out for different first decors or for any first decors, wherein the inks that bring the colour change of the second decors as close as possible to the reference colour change are selected and/or combined from the available inks.

Consequently, an undesired colour shift between the first and second decor can be minimised with limited effort for a variety of decor types.

Printing can be based on a limited number of basic colours, for example CMY(K) (cyan, magenta, yellow and optionally black/key) or CcMmYK (cyan, light cyan, magenta, light magenta, yellow and black/key).

In one embodiment of the method, at least two different ink types are provided for at least one basic colour of the inks, wherein the at least two different ink types of a basic colour have different colour changes under the change between the at least two different illuminants. In this case, printing is performed using basic colours or colour components. For example, at least one colour component and/or black component is added to predetermined base colours to match the reference colour change and the colour change of the second decoration. This colour component or black component can show a different behaviour under a change of illuminant than the predefined colour components or black components. Preferably, the difference in colour changes between the ink types is as large as possible in order to be able to reproduce a wide spectrum of reference colour changes in the second decor. For one of the basic colours, several or all of the basic colours, at least two types of ink can be provided, which exhibit colour changes that differ from one another when the illuminant is changed. The more ink types are used, the more precisely the colour change of the second decoration can be matched to the reference colour change.

For example, CMYK printing is performed using predetermined ink types for C, M, Y and K, wherein at least one other ink type selected from C", M", Y" and K" is provided that has a different colour change than the respective corresponding predetermined ink type. For printing the second decoration, it is determined whether the predetermined ink type, the corresponding further ink type or a mixture of these ink types is used to match the reference colour change and colour change of the second decoration. For example, a choice is made between ink types Y and Y" depending on which of the two yellow tones can replicate the reference colour change as closely as possible in a print of the second decoration. A CMYK colour model should also be understood to include, for example, advanced printing techniques based on CMYK colour models such as CcMmYK or CMYKOG (Hexachrome).

Likewise, an additional colour component can be added, for example, another basic colour is added to the CMYK colour model, for example, a red or orange tone, blue tone or green tone. Likewise, one of the colour components and/or the black component of the CMYK colour model can be exchanged, for example magenta is exchanged for a red or orange tone or the printing ink is mixed. In particular, the at least one added colour component lies in the gamut spanned by the predefined colour components.

On the one hand, the added colour component can increase the colour resolution in a range of the (original) gamut. Thus, the second decoration can be reproduced with higher colour resolution, wherein the colour change of the second decoration can be further approximated to the reference colour change. In particular, the added colour component has at least one further pigment type, further pigment size and/or at least one other binder compared to the predetermined colour components.

In one embodiment of the invention, the at least two different types of ink for a basic colour are provided in separate containers. A single print head may be provided for the basic colour, and the more suitable ink type for the basic colour to match the colour change of the second decoration to the reference colour change is selected and supplied to the print head for printing the second decoration.

Similarly, the at least two different ink types of a base colour may be combined prior to printing and/or during printing such that the colour change of the second decoration is matched to the reference colour change. For example, the reference colour change and the known colour change of the at least two different types of ink of a basic colour are used to determine a mixing ratio between the at least two different types of ink of a basic colour, so that an alignment of the colour change of the second decoration with the reference colour change is achieved. The mixture of the different types of inks of a basic colour can be generated before printing and fed to a single print head, for example.

Likewise, in one embodiment of the invention, at least one print head may be provided for each of the at least two different types of ink of a basic colour. Quantities of the respective ink type can be determined on the basis of the reference colour change and the known colour change of the at least two different ink types of a basic colour and used for printing. Likewise, a pixel size for printing can be assigned to the respective ink type, the pixel size being determined in such a way that the colour change of the second decor is matched to the reference colour change.

In one embodiment of the invention, the first decor and/or the second decor is designed as a plain decor. With a unicoloured first decor, the performance of the colour measurement is simplified, since a small number of (spatial) measuring points or, if necessary, a single measuring point on the first decor is already sufficient to obtain a colour change representative of the first decor.

However, in a further embodiment of the invention, the first decoration may be a multi-coloured decoration. In order to obtain the reference colour change of the multi-coloured decoration, the colour measurements may be carried out under at least two different illuminants on several sections of the first decoration. For example, a grid of measurement points is associated with the first decoration, with one colour measurement being performed at each of the measurement points under each of the at least two different illuminants.

The reference colour change can be obtained by a statistical evaluation of the colour measurements on the several sections of the first decoration. In particular, a colour change is determined for each of the sections of the first decoration. The colour changes thus determined can be subjected to a statistical evaluation, wherein the colour changes of the sections can in particular be averaged to obtain the reference colour change. In this embodiment, an average colour value is obtained for multi-coloured decors.

In one embodiment of the invention, colourimetric values from the colour measurements from several sections of the first decor are grouped. In this case, the grouping can be carried out as a function of the colour distance of the colour measurement values and, for example, sections with similar colour measurement values can be grouped with one another (e.g. with colour measurement values lying at the same intervals and/or with colour measurement values which maintain a predetermined maximum colour distance from one another). For example, at least one of $\Delta E$, $\Delta L^*$, $\Delta a^*$, $\Delta b^*$ and $\Delta h_{ab}$ (chromaticity angle difference) according to a CIELAB colour space can be used as the colour difference.

For the grouped colourimetric values or for the sections of the first decor whose colourimetric values are each assigned to a group of colourimetric values, the previously described selection/assembly of inks can be carried out in each case. Consequently, for each group of colourimetric values, a corresponding matching of the colour change of the second decor to the reference colour change is performed.

In one embodiment of the invention, the colour measurement of the sections of the first decoration is performed with a resolution of at least 100 dpi. Accordingly, the colour measurements are also representative for more finely structured multi-coloured decorations, wherein the colour change of the second decoration can be matched to the reference colour change with improved accuracy. Colour measurements of the sections of the first decor with a resolution of at least 200 dpi have proven to be advantageous for applications for furniture parts and/or interior fittings.

In a further embodiment of the invention, the colour measurement of the sections of the first decor is carried out over a measuring length of at least 1 mm, in particular at least 10 mm and/or a maximum of 220 mm. Here, measuring points can be provided, in particular, linearly or one-dimensionally. Likewise, a two-dimensional arrangement of measuring points can also be provided (e.g. in the form of a grid), wherein the two-dimensional arrangement of the measuring points has the said measuring length in at least one spatial direction.

In a further embodiment of the invention, a hyperspectral colour measurement is performed. A hyperspectral colour measurement is understood to mean in particular that intensity values are measured in several channels for different energy intervals, with at least two of the energy intervals adjoining or overlapping each other. In a hyperspectral colour measurement, adjacent intensity values are thus reproduced in particular. A hyperspectral colour measurement can thus at least partially reproduce a continuous spectrum. Among other things, a hyperspectral colour measurement has the advantage that colour information that is not visible to the eye can also be recorded.

In one embodiment of the invention, the at least two different illuminants are selected from a group comprising A, C, D50, D55, D65, D75, E, F11, F2 and F7. The illuminants correspond to the standard illuminants according to DIN 5033 and DIN 6172. In particular, D65 is selected as one of the at least two different illuminants, which can serve as a reference illuminant. The second illuminant can be selected depending on the application, wherein in particular a illuminant representative of artificial light such as F11 and/or A is used.

Based on the colour measurements, values in colour channels of a colour space can be determined. Different colour spaces can be used, for example CIE colour spaces such as the CIE XYZ colour space, CIELAB colour space or CIE LUV (1976) colour space. In principle, additive colour spaces can also be used, for example RGB colour spaces, which can be used for displays such as screens. Likewise, subtractive colour spaces and in particular CMY(K) colour spaces can be used, which are applied for example for printing processes. The CIELAB or L*a*b* colour space as expressed in the CIE standard system ("CIELAB" coordinates) is used as an example. For this, reference is also made to DIN EN ISO 11664 and in particular Part 4 of the standard. Approximately, positive a* values appear reddish, negative a* values greenish, positive b* values yellowish and negative b* values bluish, while L* indicates the brightness from 0 (white) to 100 (black).

The colour measurements can be further based on a standard observer, for example the CIE-1964 or CIE-1931 standard observer.

In one embodiment of the invention, the determination of the reference colour change is performed using at least one colour channel. The at least one colour channel is in particular selected from at least one L* (luminance), C* (chromaticity) and $h_{ab}$ (chromaticity angle). Accordingly, L*, C* and/or $h_{ab}$ are determined at the first decor for at least two illuminants. The reference colour change can be indicated, for example, by a difference of L*, C* and/or $h_{ab}$ between two illuminants. Discrete colour measurement values of the respective colour channels can also be represented via a measurement curve, wherein modelling is carried out in particular for the discrete colour measurement values, for example in the form of a compensation curve.

In one embodiment of the invention, a first component and/or a second component comprising a plate-shaped material is used. The plate-shaped material is based in particular on wood material, for example chipboard, fiberboard, OSB board (oriented strand board) and/or a compact board such as high-pressure laminated boards according to EN 438 parts 1 to 7. The plate-shaped material may be based on plastic, for example thermoplastic or thermosetting plastic. A visible side of the plate-shaped material is formed, for example, by one or both planes of the plate. In particular, the respective other component may comprise an edge profile for the plate-shaped material. Preferably, the first component comprises a plate-shaped material and has a first decoration, which is applied in particular as printed decorative paper or by direct printing. In this case, the second component comprising the edge profile is printed with the second decor or a decor carrier for the edge profile is provided with the second decor via printing. The edge profile can be attached to a narrow side of the plate-shaped material to produce the arrangement. It is also conceivable that the first component comprises an edge profile with a first decoration and the second component comprising a plate-shaped material is printed with the second decoration.

In a further embodiment of the method according to the first teaching, the first component and the second component are further used to produce a furniture part, for example by attaching an edge profile to the narrow side of a plate-shaped material as described above. Likewise, two plate-shaped materials can be combined with each other to form a furniture part, for example as a front and side part. Likewise, an interior component such as a flooring element can be manufactured, wherein, for example, the flooring element is manufactured from a plate-shaped material. The further component can, for example, be designed as a skirting board, which rests against the floor element or is connected to it.

If, according to a further embodiment, the edge profile is formed by coextrusion or extrusion, the production can be particularly economical. In the case of coextrusion, for example, the process described in DE 10 2015 118 055 A1 can be used, wherein a base body and a decorative base can be produced together, so that the use of a primer can be omitted.

According to one embodiment, the first component and/or the second component is designed as a floor element, in particular skirting board, door element, wall element, in particular wall moulding, ceiling element, in particular ceiling moulding and/or furniture part. Corresponding combinations of elements and associated mouldings can be used in interior design as arrangements with decor combinations, wherein a harmonious appearance can be achieved in particular between element and moulding through the decor combination.

The exemplary embodiments of the present invention described previously in this description are also intended to be understood as disclosed in all combinations with each other. In particular, exemplary embodiments are to be understood as disclosed with respect to the different gauges. In particular, the embodiments of process features according to the first teaching are also intended to relate to possible embodiments of the system according to the second teaching.

BRIEF DESCRIPTION OF THE DRAWINGS

Further embodiments and advantages of the invention can be found in the following detailed description of some exemplary embodiments of the present invention, in particular in connection with the drawing. The drawing shows in FIG. 1 an example of a method according to the invention, FIG. 2 a schematic representation of colour measurements on a first decor under different illuminants, and FIG. 3 a schematic representation of a decor combination with a first component and a second component.

DESCRIPTION OF THE INVENTION

Figure 1:
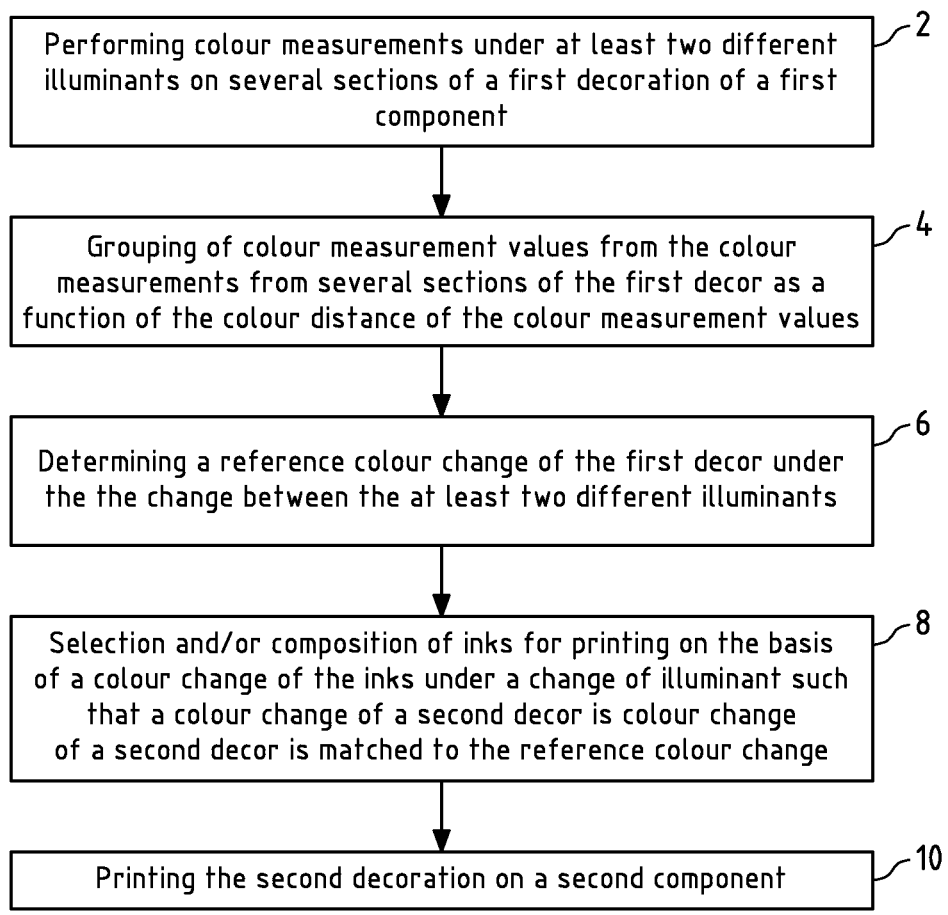

FIG. 1 shows an example of a process according to the invention in a flow chart. First, a first component with a first decor is provided, wherein the first decor is applied to the first component, for example, by direct printing or via a printed decor paper. The first component is to be combined with a second component, wherein the colour change of the decor combination is coordinated.

In action 2, colour measurements are carried out under at least two different illuminants on the first decor of the first component. For this purpose, for example, at least one colour measurement is carried out at each measuring point of the first decor under the standard illuminants D65, A and F11. A hyperspectral colour measurement is used here.

The first decor is a multi-coloured or discontinuous decor. In order to obtain representative colour measurement values for the first decor, the colour measurements are carried out under at least two different illuminants on several (spatially spaced) sections of the first decor. On the first decor, measurement points are distributed over a grid with a measurement length of 220 mm, using a resolution of at least 100 dpi and in particular at least 200 dpi. The procedure can also be carried out for plain decors.

Figure 2:
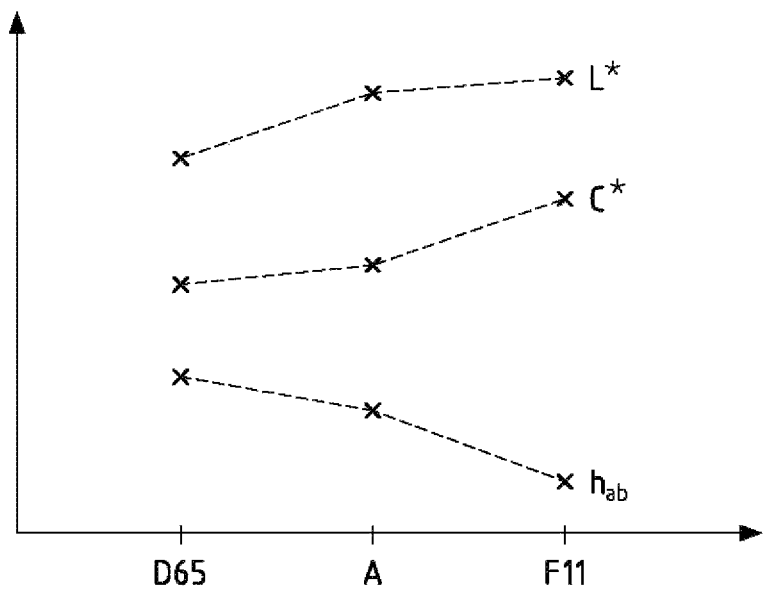

When the illuminant is changed, a colour shift of the first decor typically occurs. For this purpose, FIG. 2 schematically shows colour measurement values at a single measuring point of the first decor under different illuminants. The colour measurement values are expressed as colour channels in the CIELAB colour space, wherein the colour measurement is based on a CIE-1964 standard observer. As an example, FIG. 2 shows the colour channels L* (luminance), C* (chromaticity) and $h_{ab}$ (chromaticity angle) and their dependence on the illuminant.

For each measured section of the first decor, colour measurement values for the colour channels can be obtained depending on the illuminant and measurement curves analogous to FIG. 2. In action 4 from FIG. 1, colour measurement values of the colour measurements from several sections of the first decor are grouped. Here, similar colour measurement values are grouped to each other, wherein in particular a colour distance such as at least one of E, L*, a*, b* and/or $h_{ab}$ of the colour measurement values is used as a criterion for the grouping.

Based on the colour measurement values, a reference colour change of the first decor under the change between the at least two different illuminants is determined in action 6. For this purpose, the grouped colour measurement values from action 4 are subjected to a statistical evaluation. In one embodiment, the colour changes of the sections are averaged to obtain an averaged colour change as a reference colour change. Alternatively, for the grouped colourimetric values or for the sections of the first decor whose colourimetric values are each assigned to a group of colourimetric values, a selection and/or compilation of inks is made in each case, as described below.

Printing of the second decoration on the second component is carried out by digital printing and can also be carried out by direct printing and/or by printing on a decorative paper. Printing is performed with the predetermined ink types for C, M, Y and K, wherein at least one further ink type selected from C", M", Y" and K" is provided. The further ink types C", M", Y" and/or K" have a different colour change to the respective corresponding predefined ink type C, M, Y and K. The colour change is determined by the ink type. For the individual ink types, for example, measurement curves similar to those shown in FIG. 2 are known in advance or are determined during the process, wherein an expected colour change of the second decoration to be printed can be modelled on the basis of these colour measurement values for the ink types.

For printing the second decoration, it is determined whether the predetermined ink type, the corresponding other ink type or a mixture of these ink types is used to match the colour change of the second decoration to the reference colour change. For example, in action 8, the ink types Y and Y" are selected or the ink types are mixed in a ratio depending on which of the two yellow tones Y and Y" can replicate the reference colour change as closely as possible in a print of the second decoration.

The at least two different types of ink are mixed in separate containers and, for example, before printing and applied via a single print head in action 10. Alternatively, one print head is provided for each of the at least two different ink types, allowing the ink types to be printed independently of each other. In this case, the quantity ratios and/or the printed pixel size of the respective ink type can be varied in such a way that the colour change of the second decoration is aligned with the reference colour change.

Figure 3:
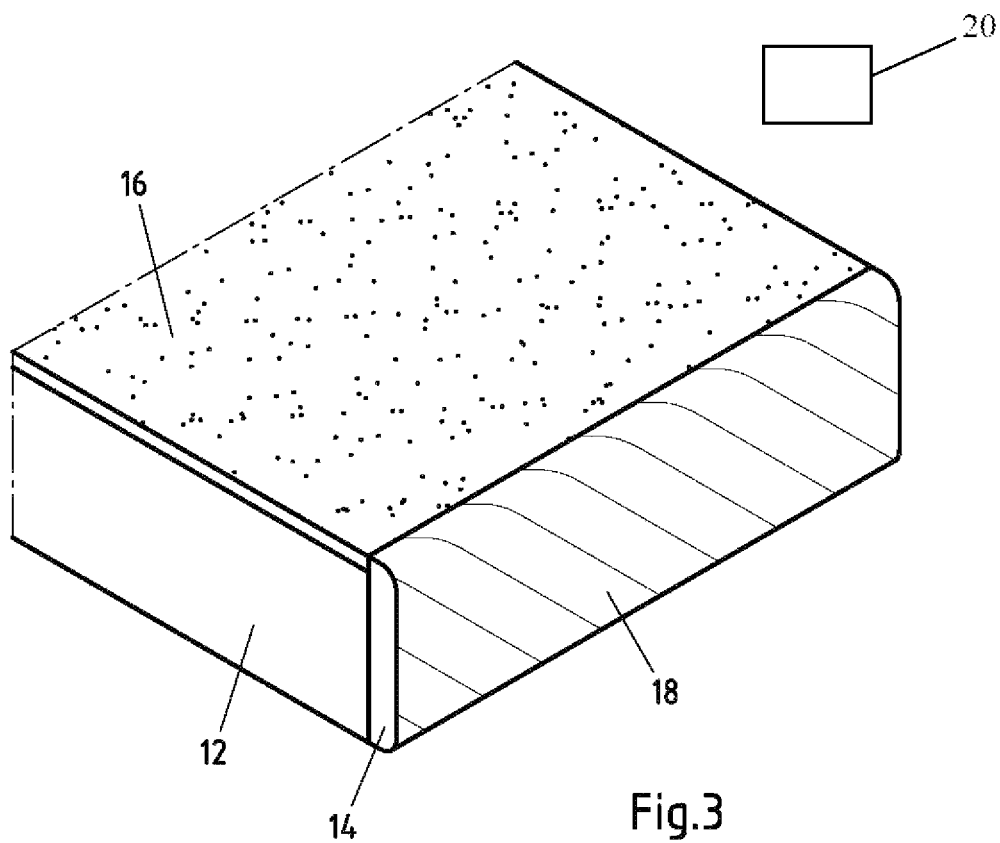

FIG. 3 further shows a schematic representation of a decor combination with a first component 12 and a second component 14 for furniture parts and/or interior fittings. The first component 12 comprises a plate-shaped material which is formed, for example, by a wood-based material board such as a chipboard or fiberboard. The first component 12 has a first decoration 16 in the form of a decorative layer which is formed, for example, by coating with a printed decorative paper or by direct printing on the visible surface of the first component 12.

A second component 14 comprising an edge profile for the plate-shaped material of the first component 12 is arranged on the narrow side of the first component 12. The second component 14 has a second decoration 18 printed on a visible surface by the method described, which together with the first decoration 16 forms a decoration combination. With the method according to the invention, it is possible to easily match or coordinate the colour changes of the first decoration 16 and the second decoration 18. A control device 20 adapted to perform a determination of a reference colour change of the first decoration under the change between the at least two different illuminants is shown.

The invention claimed is:

1. A method of providing a decor combination for furniture parts and/or interior fittings, the method comprising:
taking colour measurements under at least two different illuminants on a first decoration of a first component;
determining a reference colour change of a first decor under the change between the at least two different illuminants;
printing a second decoration on a second component,
wherein a selection or a composition of inks for the printing is performed based on a colour change of the inks under a change of illuminant such that a colour change of the second decoration under the change between the at least two different illuminants is matched to the reference colour change,
wherein at least two different types of inks are provided, each of the at least two different types of inks are of a basic colour, the at least two different types of inks of a basic colour having different colour changes under the change between the at least two different illuminants, and
wherein the at least two different types of ink of the basic colour are provided in separate containers and are combined before the printing or during the printing in such a way that the colour change of the second decoration is matched to the reference colour change.

2. The method according to claim 1,
wherein one print head is provided for each of the at least two different types of ink of the basic colour.

3. The method according to claim 1,
wherein the first decor and/or a second decor is designed as a plain decor.

4. The method according to claim 1,
wherein the first decoration is designed as a multi-coloured decoration,
wherein the colour measurements are made under the at least two different illuminants on several sections of the first decor,
wherein in particular for the sections of the first decor, colour change of the inks under the change of illuminant is determined in each case.

5. The method according to claim 4,
wherein colour measurement values from the colour measurements from several sections of the first decor are grouped, in particular depending on a colour distance of the colour measurement values.

6. The method according to claim 4,
wherein colour change of the inks under the change of illuminant is determined for each of the sections of the first decoration and the colour change of the sections is averaged to obtain the reference colour change.

7. The method according to claim 4,
wherein the colour measurement of the sections of the first decoration is carried out with a resolution of at least 100 dpi.

8. The method according to claim 4,
wherein the colour measurement of the sections of the first decoration is carried out over a measuring length in the range of 1 mm to 220 mm.

9. The method according to claim 1,
wherein a hyperspectral colour measurement is made.

10. The method according to claim 1,
wherein the at least two different illuminants are selected from a group comprising A, C, D50, D55, D65, D75, E, F11, F2 and F7, wherein in particular as one of the at least two different illuminants D65 is selected.

11. The method according to claim 1,
wherein the determination of the reference colour change is performed using at least one colour channel selected from $L^*$, $C^*$ and $h_{ab}$.

12. The method according to claim 1,
wherein the first component and/or the second component comprising a plate-shaped material is used, wherein the respective other component comprises in particular an edge profile for the plate-shaped material.

13. The method according to claim 1,
wherein the first component and/or the second component is designed as a floor element, door element, wall element, ceiling element and/or furniture part.

14. The method according to claim 4,
wherein the colour measurement of the sections of the first decoration is carried out with a resolution of at least 200 dpi.

15. The method according to claim 4,
wherein the colour measurement of the sections of the first decoration is carried out over a measuring length in a range of 10 mm to 220 mm.

16. A system for providing the décor combination according to claim 1, the system comprising:
 a colour measuring device for performing the colour measurements under the at least two different illuminants on the first decoration of the first component; and
 a printer for printing the second decoration on the second component,
 wherein the system is adapted to perform the determination of the reference colour change of the first decoration under the change between the at least two different illuminants, and
 wherein the system is adapted to determine a selection or a composition of inks for printing based on the colour change of the inks under an illuminant change such that the colour change of a second decor under the change between the at least two different illuminants is matched to the reference colour change.

* * * * *